Figure 1:
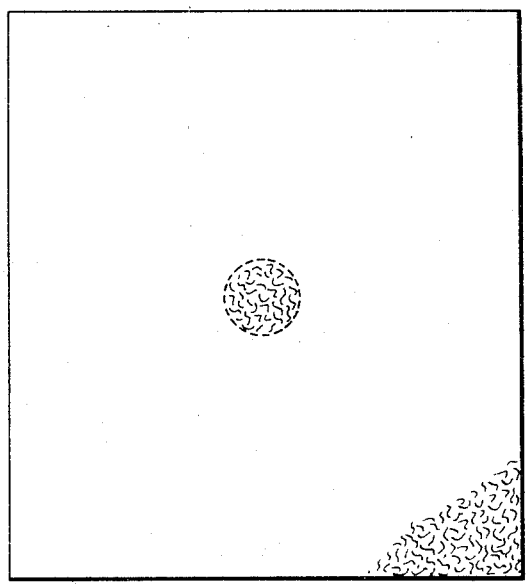

Feb. 18, 1964 J. A. ORSINO ET AL 3,121,658
BATTERY SEPARATORS OF CELLULOSIC PARTICLES ENCASED IN A SHELL
OF POLYETHYLENE AND METHOD OF FORMING SAME
Filed Aug. 9, 1960

HOLLOW
POLYMER
TUBE

POLYMER   CELLULOSIC
SHELL      PARTICLE

United States Patent Office 3,121,658
Patented Feb. 18, 1964

3,121,658
BATTERY SEPARATORS OF CELLULOSIC PARTICLES ENCASED IN A SHELL OF POLYETHYLENE AND METHOD OF FORMING SAME
Joseph A. Orsino, Mountain Lakes, N.J., and Charles E. Mandel, Ridgewood, N.Y., assignors to National Lead Company, New York, N.Y., a corporation of New Jersey
Filed Aug. 9, 1960, Ser. No. 48,344
20 Claims. (Cl. 162—146)

This application relates to battery separators for use between the plates of electrical storage batteries and, more particularly, to an improved separator to separate the negative and positive plates of a wet or dry charge storage battery.

This application is a continuation-in-part of United States patent application Serial No. 723,958, filed March 26, 1958, now abandoned.

In the manufacture of storage batteries, it is customary to place a separator between the positive and negative plates to maintain a fixed, uniform spacing and prevent contact between the plates. Since the separator, with the plates, is submerged in the electrolyte, the separator must be inert to the chemical actions within the battery and must withstand the destructive action of the electrolyte.

Although the separator is an inert part of the battery and, hence, does not enter chemically into the battery reaction, its presence between the positive and negative plates does affect the efficiency and the life of the battery. During use or discharge, ions flow through the electrolyte. This flow is reversed during recharge. Any interference with or impedance to such ionic flow causes an increase in the internal resistance of the cell and decreases the five second voltage. Due to its position between the plates, the separator is in the direct path of electrolytic and ionic flow. Thus, in addition to being inert to the chemical action, the separator must be ionically permeable.

While ionic permeability and, hence, high porosity, is a highly desirable characteristic of a separator, porosity in excess of that required for unimpeded electrolyte and ion flow is detrimental to the service life of the battery. During charge, small particles of the active material tend to leave the positive plate and are deposited on the negative plate. A major portion of these particles are exceedingly small, being colloidal, and, during charging, tend to form excrescences or trees on the negative plate. If allowed to form between the positive and negative plates, such trees bridge the spacing between the plates, short-circuit the plates and cause premature battery failure. Thus, while high porosity to allow free electrolyte and ion flow is highly desirable, the size and shape of the individual pores to prevent the formation of trees between the plates, is of equal importance.

In addition to withstanding the normal destructive action of the electrolyte, the separator must also be resistant to oxidation. Particularly during recharging, the separator is exposed to strong oxides which tend to oxidize or char the separator, especially at the separator face adjacent the positive plate. As oxidation or charring progresses in the separator, the properties and strength of the separator change. In time, depending, of course, on the severity of use of the battery, the separator may become so charred or oxidized that large sections of the separator disintegrate, allowing the plates to short-circuit. This, of course, destroys the battery.

Numerous attempts have heretofore been made to form separators which will fulfill these requirements. To a large extent, while such attempts have met with some degree of success, the separators produced have resulted in a sacrifice of one property in order to improve another, or have been so costly that the separator has found only limited use.

Of all the separators in use today, probably the one most commonly used consists in a cellulose or paper sheet or felt base impregnated with a thermosetting resin. The sheet or felt is first formed in the customary paper making manner and is then impregnated with the thermosetting resin which is then heated and set. The degree of impregnation depends on the amount of resin and the manner in which it is added to the sheet, too much resin completely filling the pores, making the separator impervious and brittle and too little resin providing insufficient penetration and insufficient protection to the cellulose in the sheet.

While thermosetting resin impregnated cellulose sheets or felts have found wide use as battery separators, such separators have a deficiency inherent from the manner in which they are formed. The cellulose fibers are first felted into a sheet or felt to form a base to which the thermosetting resin or plastic is subsequently added and thereafter set. In the felting operation, the fibers are linked or joined to each other to form an interlocked sheet or web of cellulose fibers. Thus, when the thermosetting plastic is added, only those surfaces of the felted fibers which are not connected to or joined by other fibers can be coated. Hence, after coating, there remains throughout such separator a body of interconnected and joined cellulose fibers, the interconnecting and joining comprising a cellulose to cellulose contact.

As is well known, cellulose fibers are absorptive and readily wetted by electrolytes of the type conventionally employed in batteries. Once contacted by the electrolyte, the cellulose degenerates rapidly. Because of the cellulose to cellulose contact in the impregnated paper or felted cellulose type of separator, access of the electrolyte or the oxide material to any of the cellulose fibers in the separator results in progressive degeneration of the cellulose fibers in a substantial area surrounding such fibers. Once the electrolyte has gained access to the cellulose through inadequate coating at one particular point, or failure of the coating at such point, the electrolyte migrates from fiber to fiber inside the thermoplastic coating. As the electrolyte migrates, the cellulose fibers are degenerated, weakening, and eventually resulting in failure of the separator. The rapidity at which such separator fails depends upon the area of cellulose exposed to the electrolyte. It suffices to say, however, due inherently to the cellulose to cellulose contact of the felting operation, separators of this type are only as good as the weakest point in their coating. Since, in order to preserve porosity and not block the interstices, there is a distinct limit to the amount of impregnate or coating which may be added to the paper or felt sheet, the problem of attaining an adequate, uniform coating throughout the separator is magnified.

It is an object of the instant invention to form an improved separator for use in storage batteries.

A further object of the invention is to form a porous separator without providing passages for the formation of trees between the plates.

A still further object is to provide a process for forming such separators whereby improved porous separators may be formed uniformly.

A still further object is to provide a separator of a plastic-cellulose composition in which the cellulose fibers are individually protected against degradation.

Figure 3:
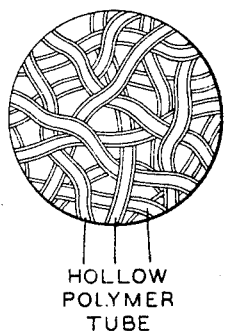
Figure 2:
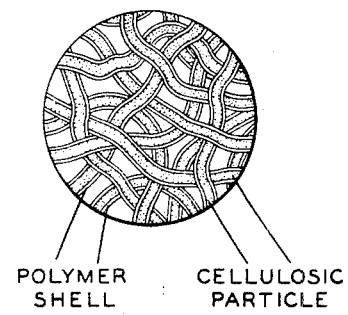

These and other objects will be more apparent from the following description and attached drawing diagrammatically illustrating the invention and in which:

FIG. 1 is a front view of a separator of the instant invention;

FIG. 2 is an enlarged view of that portion of the separator in the area enclosed with the dashed lines of FIG. 2 and showing, diagrammatically, the polymer shells formed on the cellulosic particles in accordance with the instant invention; and FIG. 3 is an enlarged view, similar to FIG. 2, but showing the polymer shells after the cellulosic material has been removed in accordance with a further embodiment of the invention.

In United States patent application Serial No. 852,844, filed November 13, 1959, and its parent application Serial No. 714,569, filed February 11, 1958 and now abandoned, there is disclosed and described a process of encasing individual particles, fibers or filaments of cellulosic material in tubes, sleeves or shells of polyolefin plastic polymerized in situ thereon. As disclosed in such application, each individual particle, fiber or filament of cellulose is substantially encased in a tube, sleeve or shell of polyolefin, the encased particles forming a free-flowing fibrous powder.

In the instant invention, we have discovered that the polymer fibers formed by individually encased fibers or filaments of cellulose in a tube or shell of polymer, as taught in the aforementioned applications, can be formed into a battery separator having improved properties. Unlike the cellulose separator where the cellulose fibers are first formed into a mat or sheet which is then impregnated with a resin, in the instant invention individual polymer fibers are first formed and, thereafter, are felted, compressed and fused into a separator of desired thickness and porosity.

When polymerized in situ on the surface of cellulose fibers as taught in the aforementioned application, the polymer forms directly on and tenaciously adheres to the outer surface of each individual cellulose particle like an integral skin. Thus, after polymerization, each individual fibrous particle comprises a cellulose fiber center encased in a shell or sleeve of the polymer, the polymer conforming substantially to the dimensions and contour of the fiber. The fibrous material thus formed is substantially uniform. When formed into a felted sheet, the fibrous formation of the sheet is retained. The pore or void formation within the sheet is similar to that of an unimpregnated felted cellulose sheet. These pores join to form tortuous paths or passages through the sheet. Since each fiber is provided with its own coating or surface of polymer before felting, the need for impregnating after the sheet is formed is eliminated. Hence, there is no filling or blocking of microporous passages which are so important in a battery separator to allow free electrolytic and ionic flow and, at the same time, prevent the formation of excrescences or trees through the separator. Porosity of the separator can be better controlled to provide a more even and uniform porosity in the finished separator.

After the cellulosic fibers are encased in tubes or shells of the polymer, the fibrous powder is agitated to disperse the fibers individually. The fibers are then suspended in a fluid medium and felted or matted with the fibers oriented randomly throughout the mat or felt. After the mat or felt is formed, the surface of the polymer tube or shell is softened to interconnect each of the polymer tubes or shells at its points of intersection with the other fibers within the mat and then set or hardened.

The softening of the polymer may be accomplished with a solvent which is thereafter removed to set the polymer, or by heating and then cooling the polymer. Because the polymer is initially coated on the individual cellulosic fibers, the polymer is distributed uniformly throughout the mat or felt. Thus, when fused, the individually encased cellulosic fibers throughout the separator are each protected or shielded against the electrolyte. Each cellulose fiber is separated or isolated from the adjoining cellulosic fiber.

The fibrous polymer-cellulose powder may be felted as a dry powder or may be slurried and formed into a paper-like web or sheet. Preferably, the separator is formed from a wet slurry employing, generally, paper-making apparatus. After the catalyst residue has been removed, water is added to the fibrous particles to form a water slurry and the slurry is agitated to break up any fiber clusters or clumps. After all clusters and clumps have been broken up and the fibers are uniformly dispersed throughout the slurry, the slurry is deposited on a paper-making felt or screen and the water is drained from the slurry by gravity or by the application of a vacuum. A wet fibrous web or felt of polymer fibers oriented randomly throughout the felt is formed on the screen. The fibrous web of polymer fibers is then dried and the fibers are fused into a self-sustained web. Preferably, the fibers are fused by heating the web to the crystalline melting temperature of the polymer to soften the polymer surface without making the polymer flowable. After the surface of the polymer shell has been softened and the shells fused, the heat is removed, allowing the web to cool, setting or hardening the fused fibers. The sintering temperature depends on the crystalline melting temperature of the polymer.

After sintering, the web is compressed to the desired thickness and density and cut to the approximate dimensions of the separator. During compression, if desired, ribs may be formed on one or both faces of the web. While compressed, the web is again heated to the sintering temperature.

The web or felt formed from the polymer-cellulosic fiber is hydrophobic. To assure free flow of the electrolyte, a wetting agent must be added. The wetting agent may be added to the polymer fibers during any stage of formation of the separator. For example, the wetting agent may be added to the slurry before the slurry is deposited on the paper-making machine or may be sprayed onto the web after it is formed. Any of the well-known wetting agents which are compatible with the polymer coated fibers and which will not disturb or react with the battery components may be employed. Dioctyl sodium sulfosuccinate, sold by American Cyanamid Company under the trademark "Aerosol," is one such wetting agent which has been found satisfactory for this purpose.

If desired and in order to attain better dispersion of the fibers in the slurry, a small amount of a dispersing agent may be added and agitated with the slurry. For example, "Marasperse," a sulfonic acid compound well-known and widely used as a dispersing agent may be used for this purpose.

For ease in formation and handling, the fibrous polymer is formed as taught in the aforementioned applications. Cellulose fibers or filaments are treated with the components of a multi-component catalyst systems before the components of the catalyst system are fully reacted with each other. The components of the catalyst system may be first mixed and brought into contact with the cellulose particles before the components have been fully reacted or, preferably, the cellulose is first treated with one of the components of the system and, either prior to or concurrent with the introduction of the monomer, the remaining component or components are added to the treated cellulose. The monomer may be any of the aliphatic 1-olefins having less than six carbon atoms and may be simple 1-olefins such as ethylene, propylene, butene-1 and the like, or diolefins such as butadiene-1,3 or isoprene.

The multi-component catalyst system may be what is known as an organo-metallic transition metal catalyst system. The components of such a catalyst system, as will be understood by those skilled in the polymer art, react when mixed together to produce a substance or substances highly active as a polymer initiator for the low molecular weight aliphatic 1-olefins. Catalyst systems which have been found to be particularly suitable are two component catalyst systems in which one component is an organo-metallic reagent such as an alkyl or aryl compound of one of the metals lithium, sodium, potassium, magnesium, calcium, zinc, cadmium, boron or aluminum, and the other component is a transition metal compound such as a halide or ester of titanium, zirconium, vanadium or chromium.

One simple and convenient manner of carrying out the treatment of the cellulose fibers or filaments is by the slurry method in which the fibers or filaments are suspended in a suitable liquid medium, such as an organic liquid that does not dissolve or react with either cellulose or the polymer to be formed. The cellulose may be treated with one of the components of the catalyst system before or after it is placed in the suspension liquid. The other catalyst component is then brought into contact with the cellulose or the two components may be added to the suspending liquid simultaneously with the cellulose fibers. Preferably, the slurry is placed in a closed reaction vessel before the second catalyst component is added. After the second component of the catalyst system has been added, the monomer is fed into the vessel at a suitable rate while maintaining the slurry under agitation. Provision should be made to control the temperature of the reaction vessel and the reaction should be carried out under substantially anhydrous conditions. As polymerization proceeds, the slurry becomes thicker and reaction is stopped when sufficient polymer has been formed. The slurry can then be removed from the reaction vessel and pressed or filtered to remove the free organic liquid and then washed in water, methanol or other materials which will easily inactivate and dissolve out the bulk of the catalyst residue. If desired, the catalyst residue may be neutralized.

While any of the aliphatic 1-olefins having less than six carbon atoms may be polymerized as shells or sleeves on cellulose particles, for purposes of the instant invention we prefer to use ethylene or propylene which have the outstanding advantage of being gases at ordinary temperature, of being relatively inexpensive and available in large quantities, and of producing polymers of high molecular weight which have very desirable properties when employed in a battery separator.

The amount of polymer formed on the individual cellulose fibers may be controlled by controlling the time of the polymerization reaction. In order to attain fibrous polymers of adequate wall thickness, and, at the same time, maintain sufficient porosity without forming pores of sufficient size to allow trees of active material to form, for use in battery separators the polymer coating on the individual particles should not be substantially less than 15% nor substantially more than 75% by weight of the entire weight of the cellulose-polymer composition. In production of commercial battery separators, a polymer coated particle having a polymer content of from 25% to 60% is preferred.

After the individual particles have been encased in shells, sleeves or tubes of the polymer, the catalytic residue is removed. The fibrous polymer particles are a relatively free-flowing powder, each particle of which includes a center or nucleus of cellulose fiber encased in a tube or shell of polymer. While the particles do not agglomerate during polymerization, some mechanical clumping of the fibers may occur in the powder. Hence, the fibers are agitated to break up any clumps.

The fibers are deposited and felted in a random orientation into a mat or sheet and the polymer surface softened to fuse the fibers together in the sheet or mat. Fusing may be accompanied by the application of pressure. Once the coating has been softened and the fibers fused, the polymer is set or hardened.

In forming the polymer fiber on cellulosic fiber, cellulosic fiber which can be felted into a sheet of randomly oriented fibers have, generally, been found acceptable. Such fibers, generally, have an average range in diameter from about 15 to 75 microns and from about 100 to 3500 microns in length. Such fibers include fibered scrap paper or newsprint and commercial cellulose floc. It has been found that commercial cellulose flocs which are sold commercially as fibers and fibrous products having a generally uniform fiber dimension provide a more uniform product.

One manner of forming the polymer fibers is by a batch process. 320 pounds of toluene and 15.75 pounds of cellulose fibers having a moisture content of approximately 5% are placed in a 50 gallon reactor. The toluene and cellulose are refluxed under nitrogen in the reactor for approximately four hours at 110° C. with agitation until no more water can be observed in the distillate. Preferably, refluxing is continued for an additional hour. Refluxing reduces the water content of the toluene to 0.01% and of the cellulose to 0.1%. The temperature of the refluxed toluene and cellulose is cooled under nitrogen to 90–95° F.

After cooling, 0.376 pound or 0.9 mol of $TiCl_4$ at 90–95° F. is added under nitrogen to the refluxed toluene and cellulose and agitated for about five minutes to attain good dispersion. Then 0.226 pound or 0.9 mol of $AlEt_3$ (triethyl aluminum) is added and the reactor is switched from nitrogen to ethylene and heated rapidly to 145° F. adjusting the flow of ethylene to the point of complete reaction. The temperature of the reactor is maintained at 148–150° F. with cooling as necessary. After thirty minutes the system is closed and the ethylene pressure increased slowly in order to polymerize the ethylene at a constant rate of 5 to 6 pounds per hour until a 50% coating by weight of the total weight of the composition is formed on the cellulose fibers. The pressure of the reactor is increased to 20 p.s.i. gauge in about one hour. When the weight of the polyethylene formed as shells on the individual fibers reaches the weight of the dry cellulose particles (15 pounds) the ethylene is shut off and the reactor vented. Additional toluene is added and the polyethylene encased particles are filtered to form a filter cake of from about 40 to 50% solids. If desired, a neutralizer such as ammonia gas, may be added with the additional toluene to neutralize the catalyst residue. The filter cake is placed in 15 gallons of boiling water and steam is passed through the water and filter cake to distill off the retained toluene. After the toluene is removed, sufficient water is added to form a pumpable slurry and the slurry is agitated for thirty minutes at 120–140° F. After agitation and while hot, the slurry is filtered to form a wet cake of about 40–50% solids.

The cake may be dried and the fibers agitated to break up clumps and clusters of the fiber and the dry fibers formed into a web of randomly oriented fibers, or water may be added to the cake to form a wet slurry and the slurried fibers formed into a felted mat of randomly oriented fibers. Preferably, the slurry method is followed. From the wet slurry, the fibers may be formed into a mat by depositing the slurry on a paper-making screen or wire or they may be formed as a sheet on a continuous paper-making wire. For production purposes, it is preferred to form the fibers in a continuous sheet.

In the continuous process, sufficient water is added to the fiber cake to form a slurry of from about 1% to 8%, preferably 4%, solids. The slurry is agitated to break up any clusters or clumps of fibers and the fibers are dispersed individually throughout the slurry. To facilitate handling of the wet sheet, especially where the fibers in the slurry are relatively short, a small amount of raw or uncoated fibers may be included in the slurry. Such raw or uncoated fibers may result from the presence of a small portion of uncoated fiber from the reactor or may be added after reaction with the monomer has been completed. Where the raw or uncoated fibers are added after reaction, preferably fibers having lengths longer than the coated fibers are employed. Since these fibers are dispersed as individual fibers throughout the slurry during agitation and, hence, in the formed sheet or felt, the presence of small amounts of uncoated fibers does not detract from the performance of the separator. In addition to facilitating the handling of the wet sheet, if longer fibers are added the stiffness of the separator is increased, aiding in the handling of the separator when the separators are interleafed with the plates in forming the battery cell. The amount of raw or uncoated fibers present in the slurry may be as high as 10% by weight, based on the weight of the solids in the slurry. Usually, 1 to 5% of longer fibers is sufficient. One such fiber which has been found acceptable for this addition is uncoated kraft fiber having an average fiber length of from about 3000 to 5000 microns. To provide a smooth, well-dispersed slurry, 0.05 to 0.1% of a dispersing agent, for example "Marasperse," may be added to the slurry. The weight of the "Marasperse" is based on the weight of the solids in the slurry.

After the fibers are well dispersed, the slurry is diluted to a consistency of between 0.1% and 5%, preferably about 1%, solids and formed as a continuous sheet on a paper-making wire at a rate to give a wet web of from 0.09 to 0.120" thick on the wire after the water is filtered out. A solution of 0.1% wetting agent, for example "Aerosol," is applied to the wet web on the wire in an amount sufficient to give a wetting agent retention in the wet web of between 0.15 to 0.25% by weight of wetting agent based on the weight of the web.

Rather than adding a dispersing agent to the slurry and a wetting agent to the wet mat, the wetting agent may be added to the slurry before the slurry is diluted. When added in this manner, it has been found that the wetting agent serves both the function of both agents and the addition of a separate dispersing agent can be eliminated. When added in this manner, the amount of wetting agent added may have to be increased in order to provide sufficient wetting agent in the mat to furnish sufficient wettability.

After the web is formed the web is passed through a heating chamber where the web is first heated to dry the web and then sintered under controlled temperature. Preferably, the wet web is transferred from the paper machine wire onto a woven wire belt and passed through the heating chamber on the wire belt. In sintering, the web is heated to a temperature to soften the polymer surface of the fiber throughout the web without permitting the polymer to flow.

The sintered web is removed from the wire belt and passed between heated rolls embossed with rib-forming grooves. The nip of the rolls is adjusted to give a backing thickness of 0.032" plus or minus 0.002" with a rib thickness of 0.074". As the sintered web passes through the heated rolls, the web is compressed and again heated to the sintering temperature where the polymer surface of the fiber is again softened without permitting any substantial polymer flow. In sintering, the interior, as well as the surfaces, of the web must be raised to the sintering temperature. For production purposes it is preferred to position the heated rolls close to the heating chamber and pass the web from the heating chamber, after initial sintering, through the heated rolls without allowing the web to cool. After the web is discharged from the heated rolls it is cooled and cut into separators.

Since the nip between the rolls is much smaller in the backing area than at the ribs, the backing area of the separator is more dense and less porous than the rib area. In order to increase the density and decrease the porosity of the rib area to assure a more uniform flow of electrolyte and to improve abrasion resistance, the surface of the rib may be coated with additional polymer or other suitable material after the ribs are formed.

Separators thus formed have been found to have a void content of from 60 to 80%, the voids being in the form of passages of microscopic size passing tortuously through the separator. These passages are substantially uniformly distributed throughout the separator and, because of their size and tortuous path, do not allow the formation of trees through the separator to cause bridging and consequent short-circuiting of the cell. The electrical resistance of such a separator has been found to run from about 0.8 to 1.5 milliohms per a 27 square inch separator and, on the average, about 1.2 milliohms per separator.

In addition to fulfilling other requirements of separators, the separator of the invention has been found to have sufficient flexibility and resiliency to compensate for expansion and contraction of the plates without unduly affecting porosity. Expansion and contraction occur largely at the negative plate, due to temperature fluctuation and volume changes during the charge-discharge cycle.

A standard 15-plate cell was fabricated in which two separators manufactured in accordance with the teaching of the instant invention were incorporated. This cell was tested in accordance with the overcharge life test of the Society of Automotive Engineers for a period of two weeks. After formation, a quantity of manganese equal to 0.01% of the weight of the electrolyte was added to the cell before the test to accelerate oxidation and was not removed from the electrolyte during the test. The cell was tested for two weeks and at the end of the test the cell was removed, the plates cut away, and the separators inspected. The separators of the instant invention were found to be intact. The ribs and web of the separator had not been adversely affected by the test and, for all practical purposes, were still completely operable. This test, particularly with the addition of the manganese, is considered to be a most rugged test of the separator.

The separators of the invention have been found to retain their properties throughout the life of the battery. Unlike commercial separators which are brittle and cannot be readily removed after use, the separator of the instant invention maintains its integrity throughout the battery life and can be removed intact.

In the concentrations of the range normally employed in battery electrolytes, the sulfuric acid has little, if any, effect on the cellulose fiber within the separator. After use little, if any, dissolution or degradation of the cellulose can be detected. The presence of the cellulosic fiber within the polymer tubes or shells adds to the stiffness of the separator and aids in forming and handling. For some purposes, for example in aircraft where a saving in weight may be desired, the cellulose fiber may be removed from the polymer tube or shell. This may be accomplished by dissolving and extracting the cellulose from the polymer shells or tubes while the polymer encased cellulose is in the form of a powder or the cellulose may be dissolved and extracted after the separator is formed and fused. For ease in forming, it is preferred to remove the cellulose after the separator is formed. Removal of the cellulose may be accomplished by treating the powder or the web with a strong solution of sulfuric acid, caustic soda and carbon disulfide, cuprammonium, or other substances that are known to dissolve or solubilize cellulosic material and which will not react with or affect the polymer. The polyolefin encased cellulose material is first immersed in the solution for a sufficient length of time to dissolve or solublize the cellulose. The solution may be agitated to facilitate circulation. After the cellulose is dissolved or solubilized, the solution is drained off and the material is washed with a fresh supply of the solution to remove the cellulose residue and then washed with water to remove the solution. A neutralizer and wetting agent may be applied after the cellulose has been removed. For ease in forming and handling, however, for most purposes it is preferred to leave the cellulose in the polymer shells or tubes.

While the separator of the invention has been particularly described as a web or mat to be placed between the positive and negative plates, it is to be understood that the fibers may be formed, suspended in a fluid medium, deposited, and sintered directly on the battery plate to form an integral unit, or the separator material may be formed into an envelope either around the plate or into which the plate may be later inserted.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A separator for separating the plates of a storage battery, said separator comprising a porous body of interfelted fibers, each of said fibers comprising a discrete particle of cellulosic material substantially encased in a shell of a polymer, said fibers being interlaced into a porous web of randomly oriented, intersecting fibers, said polymer shells of said fibers being fused at their points of contact in said web interconnecting said fibers at said points of contact and forming interconnected, tortuous paths through said body intermediate said fused points of contact.

2. In a separator as recited in claim 1, said polymer being an aliphatic 1-olefin containing less than six carbon atoms.

3. In a separator as recited in claim 1, said polymer being polyethylene.

4. In a separator as recited in claim 1, said polymer being polypropylene.

5. A plate separator for storage batteries comprising a porous body of interfelted fibers, each of said fibers having an outer shell of polymer substantially encasing said fiber, said fibers being interlaced into a porous web of randomly associated, intersecting fibers fused at their points of intersection, interconnecting said fibers at said points and forming interconnected, tortuous paths through said body intermediate said fused points.

6. A separator as recited in claim 5 in which the walls of said interconnected, tortuous paths are coated with a wetting agent.

7. A separator for separating the plates of a storage battery comprising a porous body of interfelted fibers, each of said fibers including a cellulosic fiber substantially encased in a shell of polymer, said fibers being interlaced into a porous web of randomly associated, intersecting fibers, the polymer shells on said fibers being fused at the points of intersection of said fibers to interconnect said fibers at said points and forming interconnected, tortuous paths through said body intermediate said fused points.

8. A separator as recited in claim 7, the walls of said interconnected, tortuous paths being coated with a wetting agent.

9. A separator as recited in claim 8, said polymer being polyethylene.

10. A separator as recited in claim 8, said polymer being polypropylene.

11. A separator for separating the plates of a storage battery, said separator comprising a porous body of interfelted fibers, said interfelted fibers consisting essentially of a major proportion of discrete particles of cellulosic material, each of said discrete particles being substantially encased in a shell of a polymer and a minor amount of uncoated cellulosic particles, said fibers being interlaced into a porous web of randomly oriented, intersecting fibers, said polymer shells on said discrete particles of cellulosic material being fused at their points of contact with other of said discrete particles of cellulosic material encased in a shell of said polymer interconnecting said fibers at said points of contact and forming interconnected, tortuous paths through said body intermediate said fused points of contact.

12. In a separator as recited in claim 11 in which said uncoated cellulosic particles comprise not substantially more than 10% of the total weight of the interfelted fibers in said body.

13. In a separator as recited in claim 12 in which said interconnected, tortuous paths are coated with a wetting agent.

14. A separator for separating the plates of a storage battery, said separator comprising a porous body of interfelted fibers, said interfelted fibers consisting essentially of a major proportion of discrete particles of cellulosic material, each of said discrete particles being substantially encased in a shell of a polymer and a minor amount of kraft fibers, said kraft fibers being dispersed as individual fibers throughout said porous body, said interfelted fibers being interlaced into a porous web of randomly oriented, intersecting fibers, said polymer shells on said discrete particles of cellulosic material being fused at their points of contact with other of said discrete particles of cellulosic material encased in a shell of said polymer interconnecting said fibers at said points of contact and forming interconnected, tortuous paths through said body intermediate said fused points of contact.

15. A plate separator for storage batteries comprising a porous body of interfelted fibers, each of said fibers being a hollow shell of polymer, said hollow shells being interlaced into a porous web of randomly associated, intersecting fibers fused at their points of intersection, interconnecting said fibers at said points and forming interconnected, tortuous paths through said body intermediate said fused points.

16. A process for forming a porous, fibrous battery separator from particles of cellulosic material, said particles of cellulosic material consisting essentially of a major proportion of particles of cellulosic material each particle of which is substantially encased in a shell of a polymer and a minor proportion of uncoated cellulosic particles, the steps comprising agitating said particles encased in a shell of polymer in a fluid medium with said uncoated cellulosic particles to disperse said encased and uncoated particles substantially individually in said medium and to distribute said uncoated cellulosic particles and said encased particles substantially uniformly throughout said dispersion, treating said encased and uncoated particles with a wetting agent, forming said individually dispersed particles randomly into a porous, interlaced web of intersecting fibers and, thereafter, heating said formed web to the softening temperature of the polymer to soften and fuse the polymer shells on said particles together at the points where said fibers intersect and form a self-sustaining separator.

17. In a process as recited in claim 16, said heating being accompanied by pressing said formed particles.

18. In a process as recited in claim 16 in which said polymer is polyethylene.

19. In a process as recited in claim 16 in which said polymer is polyproylene.

20. A process for forming a porous, fibrous battery separator from fibers of cellulosic material, said fibers consisting essentially of cellulosic particles each particle of which is substantially encased in a shell of polymer, the steps comprising agitating said fibers in a fluid medium to disperse said fibers substantially individually in said medium, forming said dispersed fibers into a porous, interlaced web of intersecting fibers, treating said dispersed fibers with a wetting agent and, thereafter, heating said formed web to soften and fuse the polymer shells on said particles together at the points where said fibers intersect and form a self-sustaining separator.

References Cited in the file of this patent

UNITED STATES PATENTS

| | | |
|---|---|---|
| 2,430,868 | Francis | Nov. 18, 1947 |
| 2,482,062 | Hanson | Sept. 13, 1949 |
| 2,542,771 | Hanford et al. | Feb. 20, 1951 |
| 2,662,929 | Dague | Dec. 15, 1953 |
| 2,677,008 | Fairclough et al. | Apr. 27, 1954 |
| 2,684,305 | Quinlivan | July 20, 1954 |
| 2,810,775 | Raphael et al. | Oct. 22, 1957 |

FOREIGN PATENTS

| | | |
|---|---|---|
| 534,618 | Great Britain | Mar. 12, 1941 |